United States Patent [19]
Thalmann

[11] Patent Number: 5,364,130
[45] Date of Patent: Nov. 15, 1994

[54] COUPLING FOR TUBULAR PLASTIC PIPES WITH LINER OF SOCKET AND LINER OF PIPES BEING HEAT WELDABLE

[75] Inventor: Alfred Thalmann, Uhwiesen, Switzerland

[73] Assignee: Streng Plastic AG, Niederhasli, Switzerland

[21] Appl. No.: 199,066

[22] Filed: Feb. 22, 1994

[30] Foreign Application Priority Data

Feb. 22, 1993 [CH] Switzerland .................. 00543/93

[51] Int. Cl.$^5$ ............................................. F16L 13/02
[52] U.S. Cl. ................................. 285/21; 285/55; 285/292; 285/369; 219/535; 156/274.2
[58] Field of Search ............... 285/21, 55, 423, 369, 285/288, 291, 292; 138/140, 141; 219/535, 544; 156/274.2

[56] References Cited

U.S. PATENT DOCUMENTS

| | | | |
|---|---|---|---|
| 4,096,017 | 6/1978 | Wyke et al. | 156/274.2 |
| 4,101,699 | 7/1978 | Stine et al. | 138/141 |
| 4,257,630 | 3/1981 | Bartell et al. | 285/21 |
| 4,927,184 | 5/1990 | Bourjot et al. | 285/21 |
| 5,030,489 | 7/1991 | Jöhri | 138/141 |
| 5,150,922 | 9/1992 | Nakashiba et al. | 285/21 |
| 5,152,557 | 10/1992 | Dierickx | 285/21 |

FOREIGN PATENT DOCUMENTS

| | | | |
|---|---|---|---|
| 8303190 | 4/1985 | Netherlands | 285/21 |
| 1656273 | 6/1991 | U.S.S.R. | 285/21 |

*Primary Examiner*—Eric K. Nicholson
*Attorney, Agent, or Firm*—Walter C. Farley

[57] ABSTRACT

Pipes to be joined and a pipe coupling have an outer sleeve made of a material optimized for linear and radial strength and positive connection and an inner portion or liner optimized for chemical inertness and the tightness of the connection. The pipes and coupling part are shaped to accommodate a material-correct joining procedure. Compound pipes (1) have a rigid, relatively thin pipe outer sleeve (3) for absorbing and transferring forces and a softer, relatively thin liner or inner pipe (4) to form a tight connection and inert sealing with respect to the rigid outer wall. Like the pipe, the coupling part (2) is made of a rigid joining outer sleeve (5) and a weldable socket (10), preferably made of the same material as the liner (1). Welding energy is introduced electrically. In order to cause a frictional connection on the one hand and a fluid-tight connection on the other between the two pipes, the inner pipe or liner projects beyond the outer part (3) by approximately half the length of the socket (10) at the joining point forming a free pipe end 9, which in the assembled state comes to rest in the electrically weldable socket (10). The outer sleeve on both ends of the coupling part (2) is shaped like a socket-like portion (6) so that following the introduction of the pipes into coupling part (2) it embraces the corresponding areas of the pipe outer sleeve. The full circumferences of free pipe ends (9) are welded in the vicinity of filament winding (12) and the coupling outer sleeve (5) is bonded frictionally to the pipe outer sleeve (3) in the vicinity of the socket-like portion.

6 Claims, 2 Drawing Sheets

5,364,130

COUPLING FOR TUBULAR PLASTIC PIPES WITH LINER OF SOCKET AND LINER OF PIPES BEING HEAT WELDABLE

FIELD OF THE INVENTION

The invention is in the field of plastic pipe line systems and relates to an electrically weldable coupling for rigid plastic pipes, particularly compound pipes made from glass fibre-reinforced synthetic resin materials.

BACKGROUND OF THE INVENTION

Plastics which can be readily welded have become increasingly important for pipeline construction and are used wherever possible, taking into consideration the compatibility of the pipe material with the medium to be transported and the mechanical strength of the corresponding material. Apart from weldability, which on the building sites permits a material-correct, permanent connection, an important part is also played by the usually excellent corrosion resistance of such weldable thermoplastics. Generally, it is only the relatively low mechanical strength which in many cases prevents the widespread use of such pipes in pipeline networks having an average to low operating pressure. If, in spite of this, a weldable material such as, e.g., the widely used polyethylene is used for pipes, all that can be done is to use relatively large wall thicknesses at moderate operating pressures. The upper limit for the operating pressure is about 16 bar with the present, standard thermoplastic pipe materials. Apart from the increased material requirement and the resulting costs, compared with thin pipes made from mechanically stronger materials, the reduced internal diameter, i.e., the lower usable pipe cross-section is disadvantageous and undesirable.

Over the last few years in particular manufacturers of polyethylene pipe materials (PE pipes) have made considerable efforts to develop and market material types having higher. However, the actual rise in usable operating pressure resulting from this has tended to be moderate. Compared with the much higher strength values of glass fibre-reinforced plastic pipes (GFP pipes) also used in pipeline construction, it would not appear to be the correct path. However, the sole use of GFP pipes also fails to offer the desired, wide range of applications, because such materials are subject to limitations of suitability with resurrect to the media carried in such pipes (e.g. corrosion by chemical attack, swelling by diffusion, etc.) and limitation as to the joining technology, which is complicated, expensive and difficult to handle, particularly on the construction site (e.g. tight adhesive joint). Although adhesion would constitute the material-correct joining procedure, it is associated with handling problems and quality risks, particularly in pipelines laid in the ground, and particularly because the tightness of the joint, which has absolute precedence, is mainly dependent on the skill of the pipe layer.

Thus, problems and limitations must be accepted when using GFP pipes and limitations must also be accepted when using thermoplastic, e.g., PE pipes. Each pipeline system has its own prior art and can be used in a safe and reliable manner in its own restricted field. PE pipes can be joined in a tight permanent manner because of the simple and now standardized electrical welding, which is the material-correct joining procedure, and PE pipe materials also have neutral behavior with respect to very many fluids carried. However, care must be taken at higher operating pressures. GFP pipe systems are much more difficult to join to form tight joints and/or are subject to a considerable long-term serviceability risk with respect to such pipe junctions. GFP material pipe systems have a much higher resistance to operating pressures, but there is a certain reduction in the number of fluids which can be carried.

SUMMARY OF THE INVENTION

An object of the invention is to integrate the discussed advantages into the overall function in such a way as to simultaneously be usable, while at the same time excluding the disadvantages therefrom in such a way that they do not come into effect during operation.

This object is achieved by the present invention which is essentially a functional combination of such materials in such a way that in a GFP pipe part, e.g. for the tight seal of the joint no special manual skills are necessary on the construction site, but instead considerable importance is attached to the strength characteristics. However, in the case of the PE pipe part no great importance is attached to the strength, this instead being applied with respect to the more easily produced tightness and the chemical affinity is used to the greatest possible extent, while simultaneously using the same during the manufacture and operation of pipeline systems.

Translated into structural terms, the invention includes a thermoplastic inner pipe or liner and a thermosetting plastic outer pipe, which is also transferred to the joining parts, maximum significance being attached to the more easily handlable and long-term serviceable joining procedures of this combination. This combination is brought about by a special structural form. Thus a thermosetting plastic outer pipe is provided with a thermoplastic liner as a compound pipe and the joining points for such a composite pipe are constructed as electrically weldable joining members.

The pipe joining parts must be designed in such a way that the thermoplastic liner is joined in a tight and long-term serviceable manner, whereas a longitudinally and radially frictional junction of the mechanically stressable outer pipe layer, interrupted in the welding are of the liner, of the tubular ends to be joined or the part shaped into a socket, can be linked to form a through, mechanically loadable unit. The inner layer can also be in multicoating form, i.e. have a multicoating "liner". Thus, the function of the tightness is transferred to the thermosetting plastic material, but neither need participate in the sought advantages of the other material (the liner does not have to have a high strength and the outer pipe need not be tight). The optimum and therefore material-correct joining of the two materials is maintained, the thermoplastic material being welded and the thermosetting plastic material is bonded. It is easy to weld the thermoplastic liner, whilst the connectability of the mechanically load bearing GFP outer layer can be made appropriate for the building site by structural measures.

BRIEF DESCRIPTION OF THE DRAWINGS

Preferred embodiments of the invention are described in greater detail hereinafter with reference to the drawings, wherein.

DESCRIPTION OF THE PREFERRED EMBODIMENTS

Figure 1:
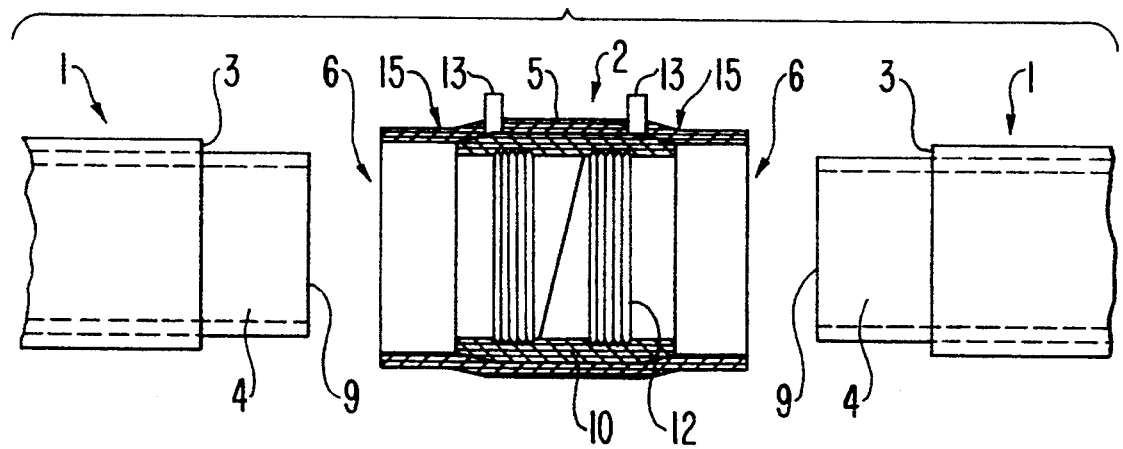
FIG. 1 is a side elevation, in partial section, of first embodiment of a pipe junction according to the invention prior to assembly.

FIG. 1 schematically shows a preferred embodiment of the invention, with the parts such as pipes and sockets in a typical position prior to the joining process. Two compound pipes 1 are to be joined by a coupling part 2. The material for the outer sleeve or pipe is selected to be optimal as to linear and radial strength and frictional connection, e.g., a glass fiber-reinforced plastic (GFP), while the material for the insert is selected on the basis chemical inertness and the tightness of the coupling, e.g. polyethylene (PE). The design of the pipe and socket is optimized with respect to a material-correct coupling, e.g. GFP/adhesive joint, PE/welded joint. The compound pipes comprise a rigid, relatively thin outer pipe 3 for absorbing and transferring forces and a softer, relatively thin inner pipe or liner 4 for the tight connection and inert sealing with respect to the rigid outer wall. Like the pipe, the coupling part 2 comprises a mechanical, load-bearing coupling outer sleeve 5 forming a force bridge across the separated pipe parts, and a weldable socket 10 as the sealing element between the separated inner pipe parts and which is preferably made from the same material as liner 4 or a material weldable therewith.

Welding energy is preferably introduced electrically and for this purpose coupling part 2 has a heating filament 12 integrated into socket 10 and also externally available electrical terminals 13. In order to bring about a frictional coupling on the one hand and a tight connection on the other between two pipes, the coupling point of liner 4 must project beyond outer pipe 3 by approximately half the length of the socket in the form of a free pipe end 9 which, in the assembled state, comes to rest in the electrically weldable socket 10. The outer sleeve of coupling part 2 is shaped on each side to form a socket-like portion 6 to mate with the differing diameters of pipes 3 and 4 so that following the introduction of the pipes 1 into the coupling part 2, the corresponding areas of the pipe outer sleeve 3 are embraced. Finally, on the coupling part 2 are provided filling points 15 for introducing an adhesive to join the ends of pipe 3 to sleeve 5 of the coupling part. They are typically nozzle-like openings through which the adhesive can be pressed, so that it can distributed between the inner wall of the socket-like portion 6 and the outer face of the pipe 1 and, as stated, this connection need only be frictional, but need not be tight with respect to the medium to be transported. This is a major advantage compared with pipe couplings which are joined by adhesion and must be made tight.

Figure 2:
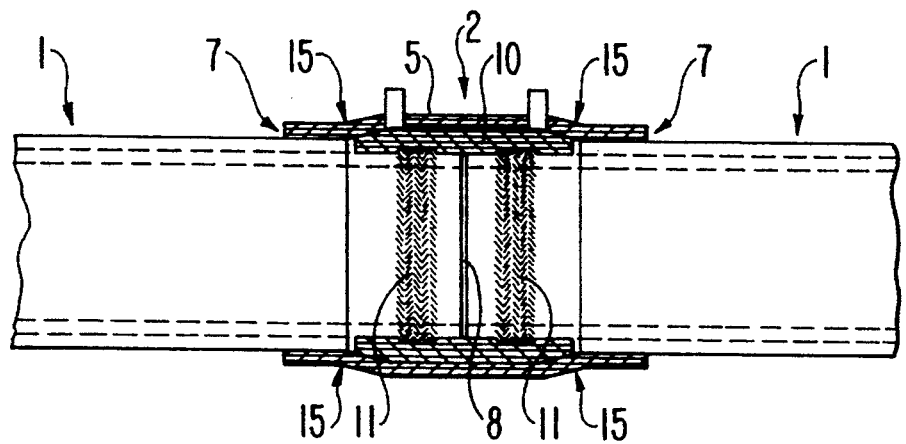
FIG. 2 is a side elevation of the pipe junction of FIG. 1 after assembly.

The inner pipe ends 9 are inserted into the socket 10 during assembly and in the vicinity of the filament winding 12 can be tightly welded together around the full circumference manner and this is represented by the welds 11 shown in FIG. 2 following the joining process. The material-correct connections or couplings, e.g. the production of such couplings, in this case adhesion and welding procedures, are based on well-established experience and in the proposed combined joining method no incalculable risks are involved. A hitherto unachieved result is obtained through the logical separation of the frictional connection and the medium-tight connection into separately optimized procedures and simultaneous use. Without one being able to negatively influence the other, but while retaining the advantages of both.

As shown in FIG. 2, the two now joined pipes 1 and the socket 10 are properly welded to the liners. The frictional junction 7 of one pipe to the other is ensured by means of the adhesion point of the socket-like portion 6 and the mechanical load-bearing outer sleeve 5. The proper connection of the liners 4 is ensured by the welds 11 and it is advantageous from the flow standpoint if the pipe ends 9 are assembled in a pipe joint 8.

Figure 3:
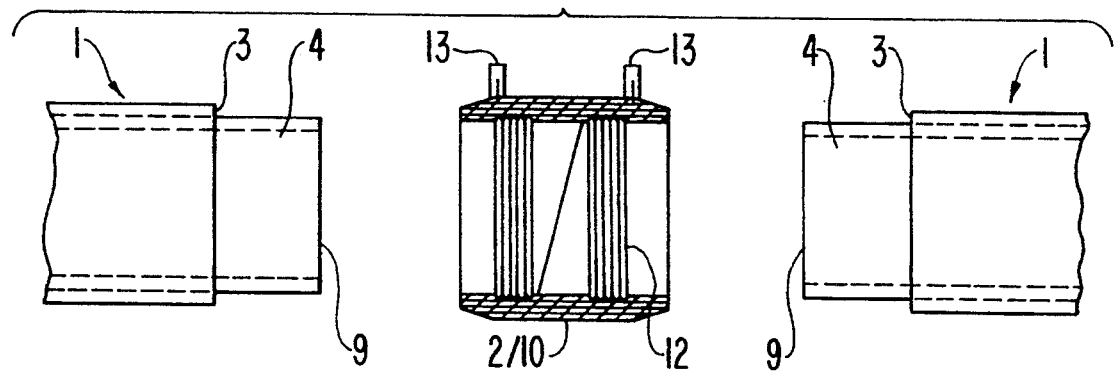
FIG. 3 is a side elevation, in partial section, of a second embodiment of a pipe junction according to the invention prior to assembly.
Figure 4:
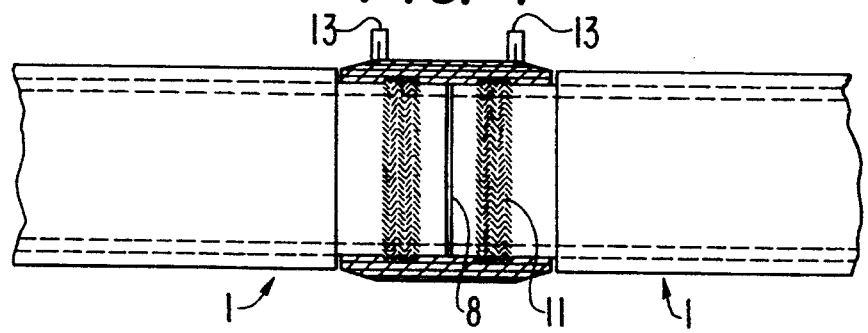
FIG. 4 is a side elevetion of the pipe junction of FIG, 3 after the assembly of the weldable liner.
Figure 5:
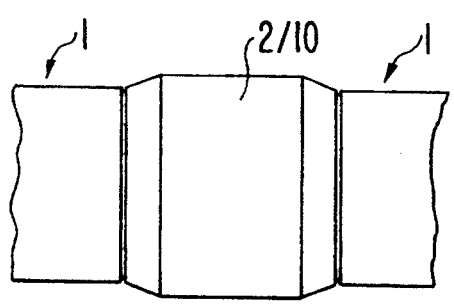
FIG. 5 is a schematic side elevation of an assembled, tight pipeline junction according to FIGS. 3 and 4 ready to receive mating outer parts of a pipe circuit for a junction or coupling according to the invention in the form of open GFP half-shells for producing a force closure.
Figure 6:
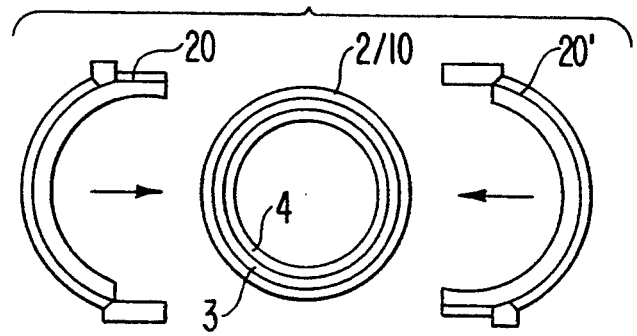
FIG. 6 is a transverse sectional view of two half-shells prior to assembly over the joint of FIG. 6.
Figure 7:
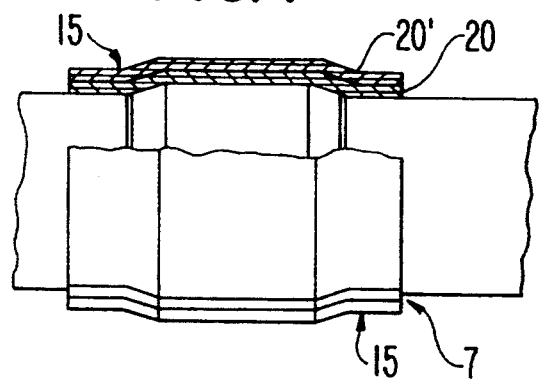
FIG. 7 is a side elevation, partly cutaway and in section of the socket according to FIGS. 5 and 6 following frictional assembly.
Figure 8:
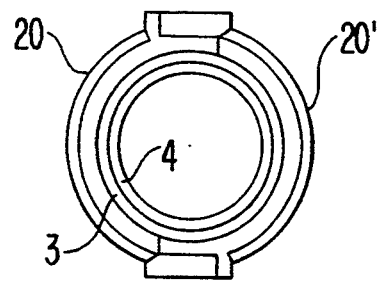
FIG. 8 is a transverse sectional view of the socket according to FIG. 7 following frictional assembly.

FIGS. 3 to 8 show a further embodiment in which, in place of a unitarily formed coupling part, the pipe coupling is made with an inner part in the form of a socket or sleeve and separate, engageable, shell-like outer parts. The pipe coupling is assembled in two operations. FIGS. 3 and 4 show the first operation, FIGS. 5 and 6 the second, while FIGS. 7 and 8 show the finished pipe coupling in side view and in section.

The two pipes 1 to be joined with the projecting pipe ends 9 are inserted into a socket 10 provided with a filament winding 12 and electrical terminals which are removable after use and joined end to end (see 8 in FIG. 4) and are welded in tight and long-term serviceable manner by an electric welding process. In the first working stage this leads to a tight liner connection, but one which has only limited mechanical loading capability according to FIG. 5. The desired, external force closure in the vicinity of the junction point is brought about by engaging two shell-like halves of reinforcement shells 20, 20' to form the force transfer bridge according to FIG. 6. The two reinforcing shells, which have a mating skeleton form, are bonded together, also in the socket-like portion 6, with outer pipe 3 of compound pipes 1. It must be ensured that any cavities which may be present between the liner connection and the skeleton form of the outer sleeve are completely filled by an adhesive and filling compound. The finished pipe coupling, as shown in FIGS. 7 and 8, has characteristics corresponding to that described in conjunction with FIGS. 1 and 2.

What is claimed is:

1. A pipe coupling comprising
   first and second compound pipes having ends to be joined, each of said pipes having an inner layer (4) and an outer layer (3);
   a socket assembly (2) having an inner liner (10) and an outer sleeve (5) for joining said pipes,
      said inner liner of said socket assembly and said inner layers of said compound pipes being made of materials which are heat-weldable to each other, and said outer sleeve of said socket assembly and said outer layers of said compound pipes being made of high-strength materials which are frictionally joinable to each other;

means (12, 13) for heating said inner layers and liner to form a welded connection of said inner liner of said socket assembly to said inner layers (4) of said pipes; and said socket assembly (2) including means at opposite ends of said sleeve for forming frictional connections (7) with said outer layers of said pipes.

2. A pipe coupling according to claim 1 wherein the materials of said outer layers (3) of said pipes (1) and said outer sleeve (5) of said socket (2) are rigid materials.

3. A pipe coupling according to claim 2 wherein said outer layers (3) of said pipes and said outer sleeve (5) are made of glass fiber-reinforced plastic, said inner layers (10) of said pipes and said inner liner (4) of said socket assembly are made of polyethylene, and said means (12, 13) for heating said inner body includes electrical wires inside of said socket assembly.

4. A pipe coupling according to claim 3 wherein said outer sleeve (5, 20) of said socket (2) comprises mating semi-cylindrical shells (20, 20').

5. A pipe coupling assembly comprising first and second compound pipes having ends facing each other, each of said pipes having an inner layer (4) and an outer layer (3);

a socket member (2) having an inner liner (10) and an outer sleeve (5) for joining said pipes, said inner liner of said socket assembly and said inner layers of said compound pipes being made of polymeric materials which are heat-weldable to each other, and said outer sleeve of said socket assembly and said outer layers of said compound pipes being made of high-strength, rigid polymeric materials which are frictionally joinable to each other;

means (12, 13) forming a fluid-tight, continuous welded connection of said inner liner of said socket assembly to said inner layers (4) of said pipes; and means at opposite ends of said sleeve for forming frictional connections (7) between said sleeve and said outer layers of said pipes.

6. A method of forming a pipe coupling comprising the steps of forming first and second compound pipes each having an end to be joined to the other pipe, each of the pipes having an inner layer (4) and an outer layer (3) with the inner layer protruding beyond the end of the outer layer, forming a socket assembly (2) having an inner liner (10) and an outer sleeve (5) for joining the pipes, the socket assembly having opposite ends with the outer sleeve protruding beyond the inner liner, the sleeve and liner being dimensioned to receive the outer layer and liner, respectively, in concentric, mating relationships, the inner liner of the socket assembly and the inner layers of the compound pipes being selected from materials which are substantially chemically inert and are heat-weldable to each other, and the outer sleeve of the socket assembly and the outer layers of the compound pipes being selected from substantially rigid, high-strength materials which are frictionally joinable to each other;

inserting the inner layers of side pipes into the opposite ends of the socket assembly, heating the ends of the inner layers and the inner liner to form a welded connection of the inner liner of the socket assembly to the inner layers (4) of the pipes; and adhering opposite ends of said sleeve to said outer layers of said pipes for forming frictional connections (7) between the sleeve and the outer layers of the pipes.

* * * * *